United States Patent
Chang et al.

(10) Patent No.: US 12,074,694 B2
(45) Date of Patent: Aug. 27, 2024

(54) ACQI DECODING CONFIDENCE DETECTION

(71) Applicant: Nokia Solutions and Networks Oy, Espoo (FI)

(72) Inventors: Jiang Chang, Hoffman Estates, IL (US); Mark Nowak, Arlington Heights, IL (US); Ronald Jameson, Fort Worth, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/272,987

(22) PCT Filed: Sep. 6, 2018

(86) PCT No.: PCT/US2018/049707
§ 371 (c)(1),
(2) Date: Mar. 3, 2021

(87) PCT Pub. No.: WO2020/050843
PCT Pub. Date: Mar. 12, 2020

(65) Prior Publication Data
US 2021/0328708 A1    Oct. 21, 2021

(51) Int. Cl.
*H04L 1/00*  (2006.01)
*H04W 24/10* (2009.01)
(52) U.S. Cl.
CPC ............ *H04L 1/0004* (2013.01); *H04L 1/001* (2013.01); *H04L 1/0016* (2013.01);
(Continued)

(58) Field of Classification Search
CPC ... H04L 1/0004; H04L 1/0054; H04L 1/0029; H04L 1/0016; H04L 1/0027;
(Continued)

(56) References Cited

U.S. PATENT DOCUMENTS 9,854,576 B2   12/2017   Ouchi et al. ................ 72/42
9,892,086 B2    2/2018   Iyer et al.
(Continued)

FOREIGN PATENT DOCUMENTS

CN   101606414 A   12/2009
CN   101641986 A    2/2010
(Continued)

OTHER PUBLICATIONS

3GPP TSG RAN WG1 Meeting #69, Prague, Czech Republic, May 21-25, 2012, R1-122699, "CQI Estimation for CoMP", Hitachi Ltd., 4 pgs.
(Continued)

*Primary Examiner* — Jianye Wu
(74) *Attorney, Agent, or Firm* — Harrington & Smith

(57) ABSTRACT

According to an example embodiment, a method is provided including: decoding, at a base station of a wireless system, one or more bits of an uplink transmission from a user equipment, wherein the one or more bits are indicative of a channel quality; calculating a confidence metric corresponding to a reliability of the decoding; and causing a channel quality report to be generated based at least on the calculated confidence metric and a value for each system configuration parameter in a limited set of one or more system configuration parameters associated with the base station.

20 Claims, 5 Drawing Sheets

---

400: DECODING, AT A BASE STATION OF A WIRELESS SYSTEM, ONE OR MORE BITS OF AN UPLINK TRANSMISSION FROM A USER EQUIPMENT, WHEREIN THE ONE OR MORE BITS ARE INDICATIVE OF A CHANNEL QUALITY

402: CALCULATING A CONFIDENCE METRIC CORRESPONDING TO A RELIABILITY OF THE DECODING

404: CAUSING A CHANNEL QUALITY REPORT TO BE GENERATED BASED AT LEAST ON THE CALCULATED CONFIDENCE METRIC AND A VALUE FOR EACH SYSTEM CONFIGURATION PARAMETER IN A LIMITED SET OF ONE OR MORE SYSTEM CONFIGURATION PARAMETERS ASSOCIATED WITH THE BASE STATION

(52) U.S. Cl.
CPC .......... *H04L 1/0029* (2013.01); *H04L 1/0054* (2013.01); *H04L 1/0073* (2013.01); *H04W 24/10* (2013.01)

(58) Field of Classification Search
CPC ... H04L 1/0045; H04L 1/0001; H04L 1/0073; G06N 20/00; H04W 24/10
See application file for complete search history.

(56) References Cited

U.S. PATENT DOCUMENTS

| | | | | |
|---|---|---|---|---|
| 2004/0110473 | A1 | 6/2004 | Rudolf et al. | .................. 455/69 |
| 2006/0023650 | A1* | 2/2006 | Dominique | ........... H04L 1/0033 370/310 |
| 2006/0072508 | A1* | 4/2006 | Zou | ....................... H04W 52/12 370/332 |
| 2016/0337072 | A1* | 11/2016 | Yang | ..................... H04L 1/0035 |
| 2017/0093428 | A1 | 3/2017 | Yen et al. | |
| 2017/0094644 | A1* | 3/2017 | Vos | ....................... H04L 1/1887 |

FOREIGN PATENT DOCUMENTS

| | | |
|---|---|---|
| EP | 1 643 700 A2 | 4/2006 |
| WO | WO 2004/051872 A2 | 6/2004 |
| WO | WO-2015/043628 A1 | 4/2015 |
| WO | WO-2018/091072 A1 | 5/2018 |
| WO | WO-2018/125686 A2 | 7/2018 |
| WO | WO-2018/142020 A1 | 8/2018 |

OTHER PUBLICATIONS

3GPP TSG RAN WG1 Meeting #88bis, Spokane, USA, Apr. 3-7, 2017, R1-1704248, "On channel coding for very small control block lengths", Huawei, HiSilicon, 6 pgs.

"Short block cods for eMBB control channels", Nokia, Alcatel-Lucent Shanghai Bell, 3GPP TSG-RAN WG1 Meeting #88, R1-1703774, Feb. 2017, 10 pages.

* cited by examiner

400: DECODING, AT A BASE STATION OF A WIRELESS SYSTEM, ONE OR MORE BITS OF AN UPLINK TRANSMISSION FROM A USER EQUIPMENT, WHEREIN THE ONE OR MORE BITS ARE INDICATIVE OF A CHANNEL QUALITY

402: CALCULATING A CONFIDENCE METRIC CORRESPONDING TO A RELIABILITY OF THE DECODING

404: CAUSING A CHANNEL QUALITY REPORT TO BE GENERATED BASED AT LEAST ON THE CALCULATED CONFIDENCE METRIC AND A VALUE FOR EACH SYSTEM CONFIGURATION PARAMETER IN A LIMITED SET OF ONE OR MORE SYSTEM CONFIGURATION PARAMETERS ASSOCIATED WITH THE BASE STATION

FIG. 4

502: FOR EACH RESPECTIVE SYSTEM CONFIGURATION IN A FIRST SUBSET OF SYSTEM CONFIGURATIONS OF A WIRELESS NETWORK:
 ANALYZING MEASUREMENT DATA ASSOCIATED WITH THE RESPECTIVE SYSTEM CONFIGURATION TO DETERMINE A RELATIONSHIP BETWEEN A CONFIDENCE METRIC AND A CHANNEL QUALITY INDICATOR DECODING PERFORMANCE METRIC FOR THE RESPECTIVE SYSTEM CONFIGURATION, AND
 DETERMINING A CORRESPONDING CONFIDENCE METRIC THRESHOLD VALUE THAT MEETS A PERFORMANCE REQUIREMENT FOR THE RESPECTIVE SYSTEM CONFIGURATION BASED ON THE DETERMINED RELATIONSHIP

504: GENERATING, VIA A MACHINE LEARNING PROCESS, A CONFIDENCE METRIC THRESHOLD MODEL TO PREDICT FURTHER CONFIDENCE METRIC THRESHOLD VALUES FOR FURTHER SYSTEM CONFIGURATIONS OF THE WIRELESS NETWORK, WHEREIN THE CONFIDENCE METRIC THRESHOLD MODEL IS TRAINED USING AT LEAST THE DETERMINED CONFIDENCE METRIC THRESHOLD VALUES FOR THE FIRST SUBSET OF SYSTEM CONFIGURATIONS AND A LIMITED SET OF ONE OR MORE SYSTEM CONFIGURATION PARAMETERS CORRESPONDING TO THE SYSTEM CONFIGURATIONS

FIG. 5

ACQI DECODING CONFIDENCE DETECTION

CROSS REFERENCE TO RELATED APPLICATION

This patent application is a U.S. National Stage application of International Patent Application Number PCT/US2018/049707 filed Sep. 6, 2018, which is hereby incorporated by reference in its entirety.

TECHNICAL FIELD

Various example embodiments relate generally to wireless networks and, more specifically, relates to device-to-device communication in wireless networks.

BACKGROUND

Typically, wireless networks allow a user equipment to provide information regarding the channel quality to the network (such as to a base station for example). The network may then decide the appropriate settings for subsequent transmissions based on this information, such as selecting the appropriate MCS (Modulation and Coding Scheme) for the DL transmission.

Some wireless networks are being designed and implemented to support the increased demand for Machine Type Communication (MTC) and Internet of Things (IoT) traffic. For example, LTE CAT-M (also referred to as eMTC, LTE-M, and LTE-MTC) is an extension of existing LTE networks that is designed to reduce cost and power consumption for MTC and IoT devices. In LTE CAT-M systems, ACQI (Aperiodic Channel Quality Indication) carried on PUSCH is transmitted by the UE unreliably without CRC (Cyclic Redundancy Check) or acknowledgement.

Abbreviations that may be found in the specification and/or the drawing figures are defined below, at the beginning of the detailed description section.

BRIEF SUMMARY

This section is intended to include examples and is not intended to be limiting.

In an example of an embodiment, a method is disclosed that includes decoding, at a base station of a wireless system, one or more bits of an uplink transmission from a user equipment, wherein the one or more bits are indicative of a channel quality; calculating a confidence metric corresponding to a reliability of the decoding; and causing a channel quality report to be generated based at least on the calculated confidence metric and a value for each system configuration parameter in a limited set of one or more system configuration parameters associated with the base station.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: decoding, at a base station of a wireless system, one or more bits of an uplink transmission from a user equipment, wherein the one or more bits are indicative of a channel quality; calculating a confidence metric corresponding to a reliability of the decoding; and causing a channel quality report to be generated based at least on the calculated confidence metric and a value for each system configuration parameter in a limited set of one or more system configuration parameters associated with the base station.

In another example of an embodiment, an apparatus comprises means for decoding, at a base station of a wireless system, one or more bits of an uplink transmission from a user equipment, wherein the one or more bits are indicative of a channel quality; means for calculating a confidence metric corresponding to a reliability of the decoding; and means for causing a channel quality report to be generated based at least on the calculated confidence metric and a value for each system configuration parameter in a limited set of one or more system configuration parameters associated with the base station.

In an example of an embodiment, a method is disclosed that includes for each respective system configuration in a first subset of system configurations of a wireless network: analyzing measurement data associated with the respective system configuration to determine a relationship between a confidence metric and a channel quality indicator decoding performance metric for the respective system configuration, and determining a corresponding confidence metric threshold value that meets a performance requirement for the respective system configuration based on the determined relationship; and generating, via a machine learning process, a confidence metric threshold model to predict further confidence metric threshold values for further system configurations of the wireless network, wherein the confidence metric threshold model is trained using at least the determined confidence metric threshold values for the first subset of system configurations and a limited set of one or more system configuration parameters corresponding to the system configurations.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: for each respective system configuration in a first subset of system configurations of a wireless network: analyzing measurement data associated with the respective system configuration to determine a relationship between a confidence metric and a channel quality indicator decoding performance metric for the respective system configuration, and determining a corresponding confidence metric threshold value that meets a performance requirement for the respective system configuration based on the determined relationship; and generating, via a machine learning process, a confidence metric threshold model to predict further confidence metric threshold values for further system configurations of the wireless network, wherein the confidence metric threshold model is trained using at least the determined confidence metric threshold values for the first subset of system configurations and a limited set of one or more system configuration parameters corresponding to the system configurations.

In another example of an embodiment, an apparatus comprises, for each respective system configuration in a first subset of system configurations of a wireless network: means for analyzing measurement data associated with the respective system configuration to determine a relationship between a confidence metric and a channel quality indicator decoding performance metric for the respective system configuration, and means for determining a corresponding confidence metric threshold value that meets a performance requirement for the respective system configuration based on the determined relationship; and means for generating, via a machine learning process, a confidence metric threshold model to predict further confidence metric threshold values for further system configurations of the wireless network, wherein the confidence metric threshold model is trained using at least the determined confidence metric threshold values for the first subset of system configurations and a limited set of one or more system configuration parameters corresponding to the system configurations.

BRIEF DESCRIPTION OF THE DRAWINGS

Some example embodiments will now be described with reference to the accompanying drawings.

FIGS. 4 and 5 are logic flow diagrams for ACQI decoding confidence detection, and illustrate the operation of an exemplary method or methods, a result of execution of computer program instructions embodied on a computer readable memory, functions performed by logic implemented in hardware, and/or interconnected means for performing functions in accordance with exemplary embodiments.

DETAILED DESCRIPTION

Figure 1A:
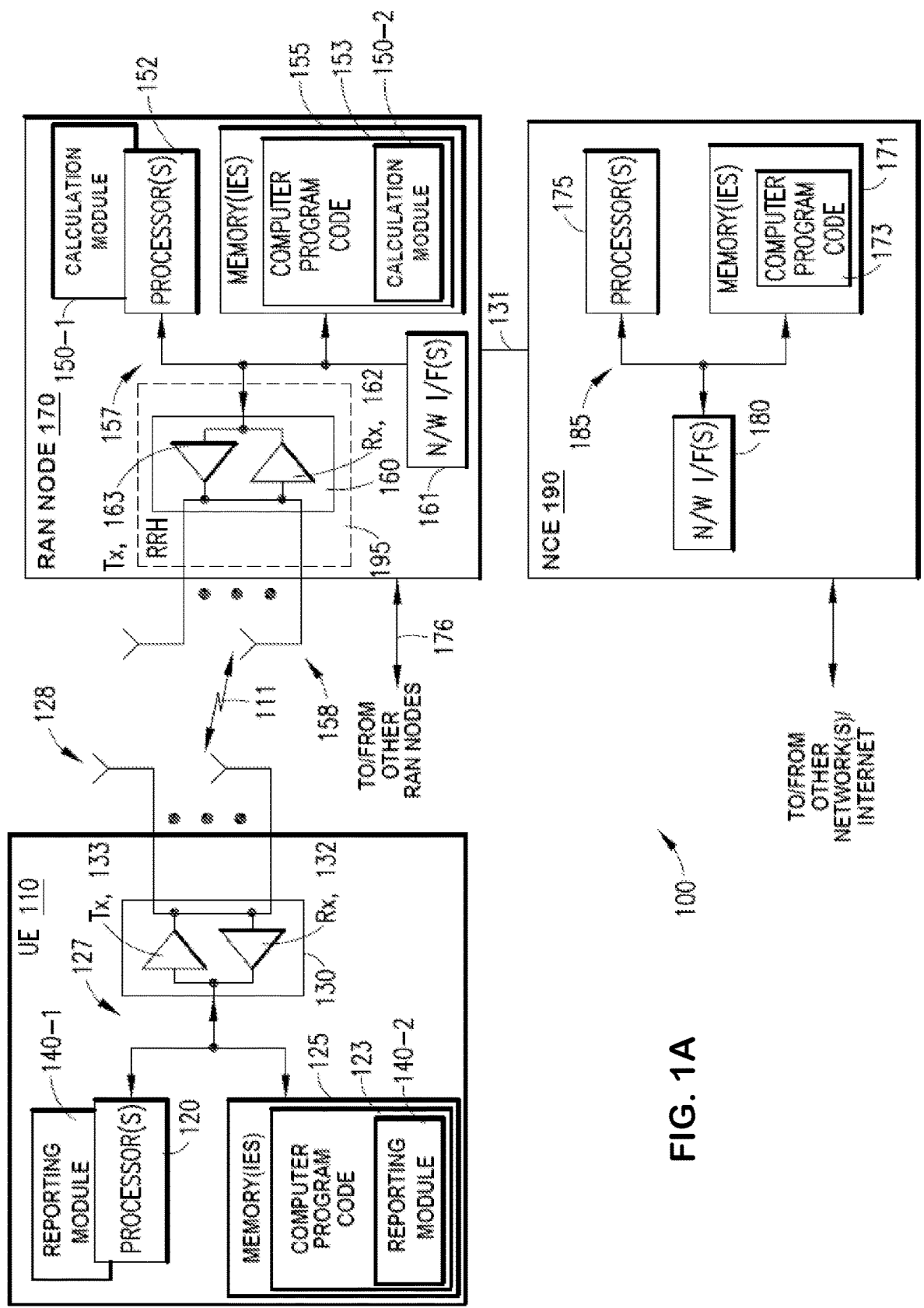
FIGS. 1A and 1B are block diagrams of possible and non-limiting exemplary systems in which the exemplary embodiments may be practiced.

The following abbreviations that may be found in the specification and/or the drawing figures are defined as follows:

| | |
|---|---|
| 3GPP | third generation partnership project |
| 4G | fourth generation |
| 5G | fifth generation |
| ACQI | aperiodic channel quality indication |
| BLER | block error rate |
| CAT-M | category M |
| CM | confidence metric |
| CRC | Cyclic Redundancy Check |
| DL | downlink |
| eMTC | evolved MTC |
| eNB | evolved Node B |
| (or eNodeB) | (e.g., an LTE base station) |
| FHT | Fast Hadamard Transform |
| gNB | base station for 5G/NR |
| (or gNodeB) | |
| I/F | interface |
| IoT | internet of things |
| LLR | log-likelihood ratio |
| LTE | long term evolution |
| MCS | modulation and coding scheme |
| MME | mobility management entity |
| MTC | machine type communications |
| N/W or NW | network |
| NCE | network control element |
| NR | new radio |
| PRB | physical resource block |
| PUSCH | physical uplink shared channel |
| Rel | release |
| RM | Reed-Muller |
| RRH | remote radio head |
| Rx | receiver |
| SGW | serving gateway |
| SNR | signal to noise ratio |
| TBS | transport block size |
| TS | technical specification |
| Tx | transmitter |
| UE | user equipment |
| | (e.g., a wireless, typically mobile device) |

The word "exemplary" is used herein to mean "serving as an example, instance, or illustration." Any embodiment described herein as "exemplary" is not necessarily to be construed as preferred or advantageous over other embodiments.

The exemplary embodiments herein describe techniques for ACQI decoding confidence detection. Additional description of these techniques is presented after a system into which the exemplary embodiments may be used is described.

Turning to FIG. 1A, this figure shows a block diagram of one possible and non-limiting exemplary system in which the exemplary embodiments may be practiced. In FIG. 1A, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a reporting module, comprising one of or both parts 140-1 and/or 140-2, which may be implemented in a number of ways. The reporting may be implemented in hardware as reporting 140-1, such as being implemented as part of the one or more processors 120. The reporting 140-1 may be implemented also as an integrated circuit or through other hardware such as a programmable gate array. In another example, the reporting may be implemented as reporting 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with radio access network (RAN) node 170 via a wireless link 111.

The RAN node 170 may be a base station that provides access by wireless devices such as the UE 110 to the wireless network 100. For example, the RAN node 170 may be a node (for example, a base station) in a NR/5G network such as a gNB (a node that provides NR user plane and control protocol terminations towards the UE 110), an ng-eNB (a node providing E-UTRA user plane and control plane protocol terminations towards the UE 110, and connected via an NG interface to the core network (i.e. 5G Core (5GC)), or or a eNB in a LTE network for example. The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The RAN node 170 includes a calculation module, comprising one of or both parts 150-1 and/or 150-2, which may be implemented in a number of ways. The calculation module may be implemented in hardware as calculation module 150-1, such as being implemented as part of the one or more processors 152. The calculation module 150-1 may be implemented also as an integrated circuit or through other hardware such as a programmable gate array. In another example, the calculation module may be implemented as calculation module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the RAN node 170 being physically in a different location from the RRH, and the one or more buses 157 could be implemented in part as fiber optic cable to connect the other elements of the RAN node 170 to the RRH 195.

It is noted that various RAN node functions may be virtualized functions instantiated on an appropriate platform, such as a cloud infrastructure. For example, the RAN node 170 may include a centralized unit (CU) and one or more distributed units (DUs) interconnected through an F1 logical interface. Together, a CU and underlying DUs may be considered as forming a logical base station. The CU may be considered a logical node that hosts some base station protocols, and may control, at least in part, the operations of the one or more DUs. The one or more DUs may host the remaining base station protocols. As an example, the CU may host the RRC, SDAP, and PDCP protocols, and the one or more DUs may host the RLC, MAC, and PHY layer protocols. A CU may also be known with other names such as BBU/REC/RCC/C-RAN/V-RAN, and a DU may also be known with other names such as a RRH/RRU/RE/RU.

It is also noted that the description herein indicates that "cells" perform functions, but it should be clear that the RAN node that forms the cell will perform the functions. The cell makes up part of a RAN node. That is, there can be multiple cells per RAN node. For instance, there could be three cells for a single RAN node carrier frequency and associated bandwidth, each cell covering one-third of a 360 degree area so that the single RAN node's coverage area covers an approximate oval or circle. Furthermore, each cell can correspond to a single carrier and a RAN node may use multiple carriers. So if there are three 120 degree cells per carrier and two carriers, then the RAN node has a total of 6 cells.

The wireless network 100 may include one or more network control elements (NCE) 190, each of which includes functionalities for carrying out a set of network functions (NFs), and may provide connectivity with a further network, such as a telephone network and/or a data communications network (e.g., the Internet). The set of NFs may include, for example, an Access and Mobility Function (AMF) and a User Plane Function (UPF). The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations. The RAN node 170 is coupled via a link 131 to the NCE 190. The link 131 may be implemented as, e.g., an NG interface for 5G, or an Si interface for LTE, or any other suitable interface for other standards. In case of an LTE network, the NCE 190 may include a MME (Mobility Management Entity) and SGW (serving gateway) functionalities.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

Figure 1B:
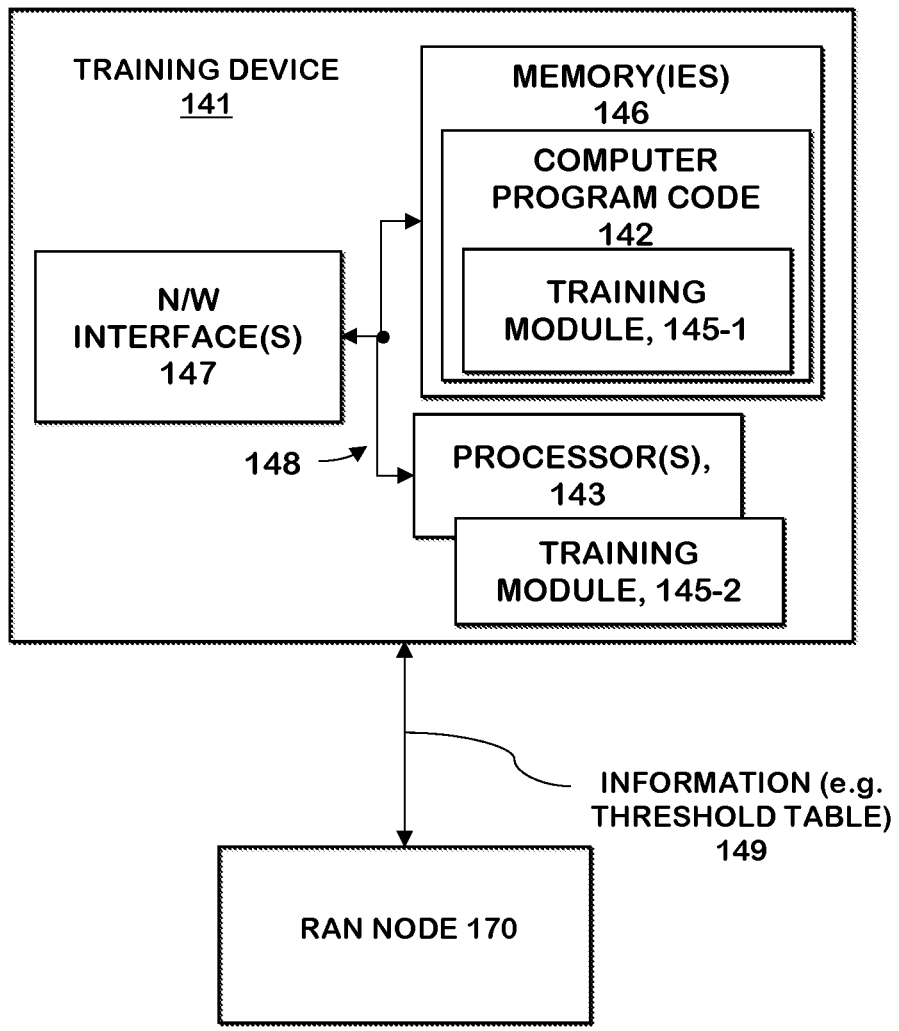

Referring also to FIG. 1B, this figure shows a block diagram of one possible and non-limiting example of a training device 141 in accordance with exemplary embodiments. In this example, training device 141 for determining and providing information 149 to the RAN node 170 for ACQI decoding confidence detection. The information 149 includes, for example, a confidence threshold table as discussed in more detail below. It is noted that in some examples, the information 149 may alternatively or additionally be provided to other network elements (such as NCE 190 for example). The training device 141 may be a training computer that includes one or more processors 143, one or more memories 146, and one or more network interfaces (N/W I/F(s)) 147, interconnected through one or more buses 148. The one or more memories 146 include computer program code 142. The training device 141 includes a training module, comprising one of or both parts 145-1 and/or 145-2, which may be implemented in a number of ways. The training module may be implemented in hardware as calculation module 145-1, such as being implemented as part of the one or more processors 143. The calculation module 145-1 may be implemented also as an integrated circuit or through other hardware such as a programmable gate array. In another example, the calculation module may be implemented as training module 145-2, which is implemented as computer program code 142 and is executed by the one or more processors 143. For instance, the one or more memories 146 and the computer program code 142 are configured to, with the one or more processors 143, cause the training device 141 to perform one or more of the operations as described herein. The one or more network interfaces 147 communicate information 149 with a RAN node 170 using a suitable interface (such as a wireless and/or wired interface for example). The one or more buses 148 may be address, data, or control buses, and may include any interconnection mechanism, such as a series of lines on a motherboard or integrated circuit, fiber optics or other optical communication equipment, and the like.

The computer readable memories 125, 146, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 146, 155, and 171 may be means for performing storage functions. The processors 120, 143, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 143, 152, and 175 may be means for performing functions, such as controlling the UE 110, training device 171, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the various exemplary embodiments, the exemplary embodiments will now be described with greater specificity.

Although the description below generally is described in the context of LTE CAT-M systems, this is not intended to be limiting and those skilled in the art will appreciate that these teachings are equally applicable to other wireless networks for determining a confidence in in decoding channel quality information.

As noted above, in LTE CAT-M systems, ACQI (Aperiodic Channel Quality Indication) carried on PUSCH is transmitted by a UE unreliably without CRC (Cyclic Redundancy Check) or acknowledgement. The ACQI is an indication of the DL (Downlink) channel quality. The eNodeB will select appropriate MCS (Modulation and Coding Scheme) for the DL transmission based on the ACQI report. The ACQI reports are 'one shot' rather than continuous. Unlike in LTE system, where we can take advantage of performing ACQI filtering with the continuous ACQI reports the LTE CAT-M eNodeB physical layer will only provide an ACQI measurement once during call setup. As a result, the physical layer should report decoded ACQI to the upper layer (e.g. the scheduler) only when the ACQI decoding has a high confidence level since an incorrect ACQI report may result in an inappropriate MCS being used in the DL transmission and cause DL decoding errors.

The above requirement can be achieved by CRC check if CRC was attached with the ACQI. However, there is no CRC attachment if the number of ACQI bits is less than 12. For the latter case, a properly devised ACQI decoding Confidence Metric (CM) and a corresponding decision method (for ACQI report) are needed so that the probability of incorrect ACQI reporting can be controlled.

Current attempts to minimize the effect of decoding mistakes include sending multiple embedded ACQI data in legacy PUSCH and restricting changes to MCS to small deltas, so that large changes in MCS are not possible. The system will then gradually reach the appropriate MCS; comparing a received training bit sequence with a locally generated one; gathering data by CRC failure; gating audio by signal quality estimation (long term reference symbol-based SNR estimate); and gating audio by BER estimation.

However, each one of these references suffers from one or more of the following disadvantages: sending multiple messages (as opposed to, e.g., LTE CAT-M where only one message is intended); requiring overhead of sending training data over the air; requires the overhead of sending CRC data; requiring pilot symbols and requires SNR over time to be a reliable metric; requiring overhead of having decoded data be re-encoded and compared to received data Example embodiments herein are related to a confidence metric design as a measure of the confidence level of the ACQI decoding. Example embodiments are also related to determining a threshold and a decision method for the ACQI report to make use of said confidence metric design.

For example, the decoding confidence metric may be for ACQI report without CRC attachment and be based on the "correlation metric" (for codeword selection) calculated during ACQI Reed-Muller (RM) decoding. Compared to other indirect or pre-decoding confidence metric, for example, LLR (Log-likelihood Ratio) erasure rate or raw SNR, the proposed post-decoding metric is a more accurate measurement of successful decode confidence because it incorporates the effects of many other factors impacting the ACQI decoding performance, such as SNR, LLR erasure rate, ACQI transmission codeword length and number of repetitions used by CAT-M devices, and/or the like. The overhead for calculating the confidence metric in accordance with exemplary embodiments is extremely low as compared to other metrics since almost all computation is done during ACQI decoding, enables less measurements for threshold modeling, and provides a simple decision method (for ACQI report) as explained in further detail below.

For LTE CAT-M, there are many system configuration combinations for ACQI decoding, and thus it is impractical to, for example, determine a threshold for each configuration exclusively from experimental measurements. Example embodiments described herein leverage machine learning techniques to provide efficient threshold modeling and a decision method for ACQI report. According to some example embodiments, a set of "compressed features" are selected from the many system configurations. For example, the set of compressed features may refer to a limited set of at least two system configuration parameters. The set is limited in the sense that it includes less than all possible system configuration parameters. In some non-limiting examples described herein the set of compressed features includes one or more system configuration parameters. In one example embodiment, the set of compressed features includes two parameters. Other example embodiments may include more than two parameters, however, it is noted that introducing more features will make training the model and the threshold table more complex and may be less robust. Thus, the number of selected features is preferably minimalized to reduce the complexity and threshold table size while still meeting the performance requirements.

The relationship between the confidence metric and the ACQI decoding or ACQI reporting performances may be built based on measurement data for certain selected configurations (characterized by the compressed feature set). A confidence metric threshold for each selected configuration can be calculated based on the ACQI decoding or ACQI reporting performance requirements. The eNodeB physical layer may report the decoded ACQI to the scheduler only when the ACQI decoding confidence metric is greater than this threshold. In other words, ACQI decodes with poor confidence are discarded.

A confidence threshold model for each system configuration can be created using supervised machine learning techniques and using samples of the thresholds and corresponding compressed feature set as training data. Once the model parameters are determined, the thresholds for all possible system configurations (characterized by the compressed feature set) can be predicted using the trained model. An ACQI decoding confidence metric threshold table may then be created based on this trained model. Each entry in the table may be indexed by the compressed feature set. The physical layer of the eNodeB may then utilize the table before making decisions on reporting ACQI.

Compared to other metrics, such as LLR erasure rate and SNR for example, the relationship between the proposed confidence metric and the ACQI decoding performance is smoother and more consistent which enables less features to be used in the modeling. The threshold predications are more accurate with the proposed confidence metric due to the smooth performance curves.

Figure 2:
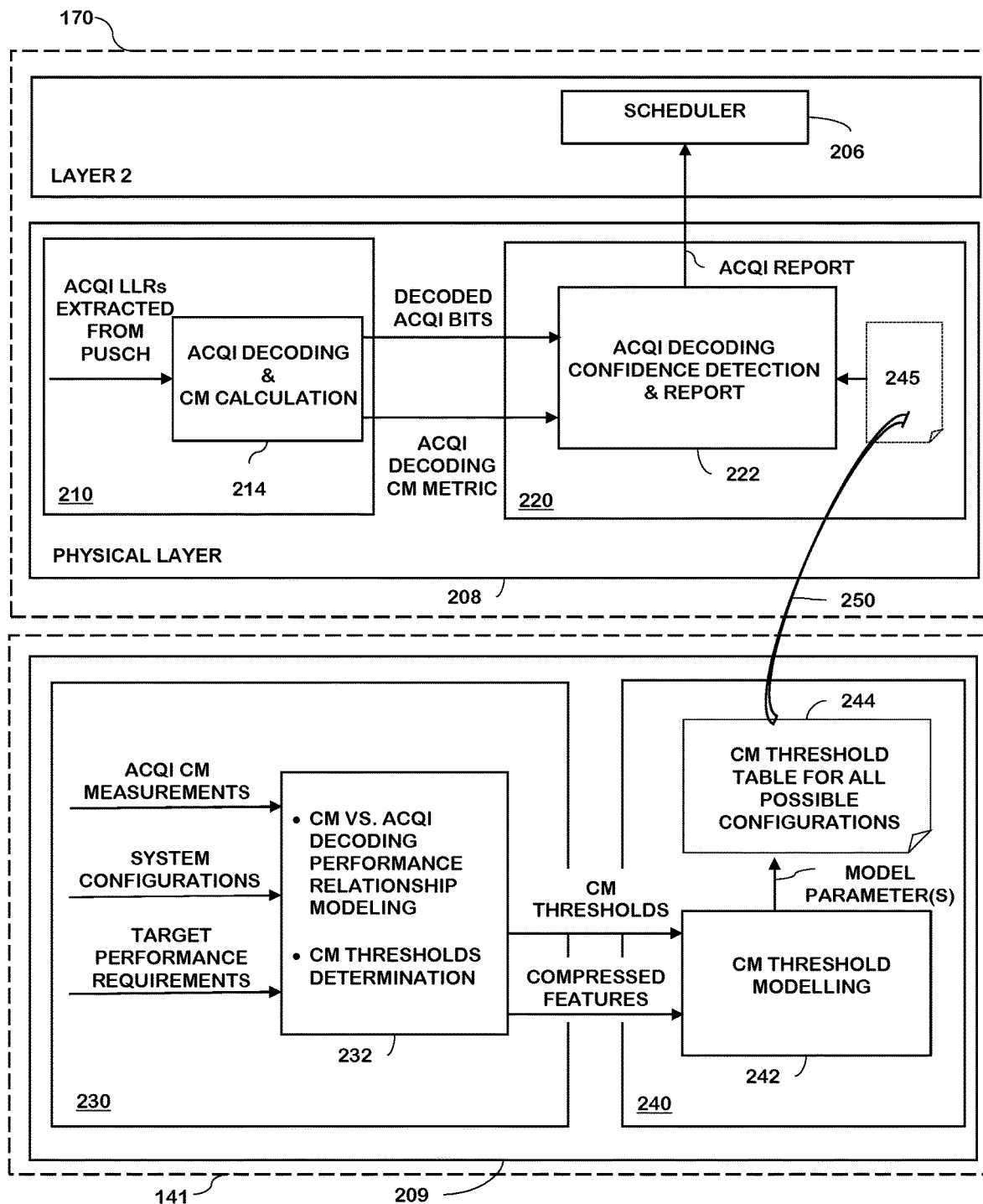
FIG. 2 shows an example embodiment of the subject matter described herein.

Referring now to FIG. 2, this figure shows an example architecture of a system for detecting ACQI decoding confidence in accordance with exemplary embodiments. The system includes two components 208, 209.

In the example shown in FIG. 2, component 208 is implemented at the physical layer in a RAN node 170, which in some example embodiments is a LTE CAT-M eNodeB. For example, component 208 may be implemented as calculation module 150-1 and/or 150-2 of RAN node 170 in FIG. 1A. Component 208 may include an ACQI decoding and confidence metric calculation module 210, and an ACQI decoding confidence detection and report module 220.

Component 209 is used for ACQI decoding CM measurement and CM threshold determination and modeling. In some examples, component 209 is implemented in a computer, such as training device 141 for example. For example, component 209 may be implemented as training module 145-1 and/or 145-2 of training device 141 in FIG. 1B. Component 209 includes a measurement and threshold determination module 230 for selected system configurations, and an ACQI CM threshold modeling module 240. Module 240 generates the CM threshold table for all system configurations to be looked up by module 220 of component 208. The functionality of each module 210, 220, 230, 240 is discussed in more detail below.

ACQI Decoding and Confidence Metric Calculation Module

In an example embodiment, the ACQI decoding and confidence metric calculation module 210 performs extended Reed-Muller (RM) decoding with the input ACQI Log-Likelihood Ratios (LLRs) extracted from PUSCH. In the extended Reed-Muller decoding, a set of "correlation metrics" is calculated at block 214 through demasking and Fast Hadamard Transformation (FHT) for each candidate codeword. The confidence metric associated with this ACQI decoding:

$$CM = \max_i |M_i| \quad (1)$$

where $M_i$ denotes the correlation metric for candidate codeword i.

For completeness, it is noted that if the number of ACQI encoding bits is less than or equal to six, then basic Reed-Muller decoding may be performed using the Fast Hadamard Transformation (FHT). This is the case as the base code is a standard Reed-Muller code which uses the FHT basis sequences augmented with the all 1's sequence. If the number of ACQI encoding bits is greater than six, then preprocessing (i.e. 'demasking') is performed so that after demasking, the FHT to decode the remaining six bits may still be used. For example, in some example embodiments there are seven information bits and so an additional 'masking' sequence is used in the matrix multiply at the encoder. Demasking involves vector multiplying the received bits by all possible composite masks that can be created from all of the potentially possible input bits above the initial six (which in this specific case are zero and one) and the single necessary masking sequence. The FHT will then be performed on these two products and the one that generates the largest value will be chosen.

The CM is a measure of the level of confidence for ACQI decoding. To use this metric, the relationship between the metric and the ACQI decoding reliability is quantified, e.g., the ACQI decoding Block Error Rate (BLER). This functionality is implemented in module 230 and explained in further detail below. The inputs to module 210 are the ACQI LLRs extracted from the PUSCH channel; and the outputs from module 210 are the decoded ACQI bits and a confidence metric associated with the ACQI decoding. The two outputs are sent to module 220 as inputs.

ACQI Decoding Confidence Detection and Report Module

Before reporting the decoded ACQI to the layer 2 scheduler 206, module 220 compares the ACQI decoding CM against a threshold as illustrated by block 222. The module 220 reports ACQI only if the CM is greater than the threshold for the decoding configuration, such as shown in the following pseudo-code:

1: if CM>threshold
2: report ACQI
3: else
4: discard ACQI

For example, the module 220 may compare the ACQI decoding CM using a CM threshold table 245. The CM threshold table 245 may be based on the CM threshold table 244 created by module 240 as explained in more detail below. The inputs to module 220 are the decoded ACQI bits from module 210 and the CM associated with the ACQI decoding. The output from module 220 is the ACQI report to the scheduler 206 (e.g. an LTE CAT-M scheduler).

ACQI Measurement and Threshold Determination Module

In an example embodiment, the module 230 builds a relationship between the CM and the ACQI decoding performance so that the CM calculated in module 210 may be utilized. The ACQI decoding performance depends on different systems configuration. For example, in LTE CAT-M system, the different systems configurations may depend on, for example:

- A number of ACQI information bits to be reported
- PUSCH transmission bandwidth in PRBs (Physical Resource Blocks)
- PUSCH Transport Block Size (TB S)
- Number of repetitions for CAT-M PUSCH transmission ($Nre_p$)
- CQI offset
- Operation conditions (such as Signal to Noise Ratio (SNR) for example)

There are many different system configuration combinations, and so performing ACQI decoding performance and CM measurements for each configuration combination is not practical. To reduce the degree of freedom for the configuration combinations, some example embodiments extract certain key features and perform experimental measurements on a limited number of selected configurations.

The number of resources (or number of bits) available for ACQI transmission for a specific number of ACQI information bits depends on the different system configurations listed above. According to some example embodiments, a number of bits available for ACQI transmission is defined as the ACQI TX codeword length and is denoted as $L_{cw}$. Different system configurations may result in the same $L_{cw}$ which is closely related to the ACQI decoding performance. Two or more key features may be selected to perform the ACQI decoding CM measurements. As a non-limiting example, $L_{cw}$ and $N_{rep}$ may selected as the two key features (also referred compressed features) to perform the ACQI decoding CM measurements. In other words, the ACQI decoding CM statistics will be collected for certain selected system configurations characterized by the compressed feature set $\{L_{cw}, N_{rep}\}$ over a reasonable range of SNRs. For example, a range generally covering the neighborhood around the target ACQI BLER (such as BLER=1% for example). As a non-limiting example, measurements may be performed with an SNR range from 2 dB to −17 dB. In some example embodiments, the selected system configurations could be sparse samples over the LTE CAT-M operation range to minimize the measurement efforts.

Given the ACQI CM measurements above, there are different possible options to build up the relationship between the ACQI decoding performance and CM, depending on what performance metric is used. One possible performance metric is based on the ACQI decoding reliability, such as ACQI decoding BLER for example. In this case, the relationship between the ACQI decoding BLER and the CM will be built for each selected configuration with the measurement data as represented by block 232.

Figure 3:
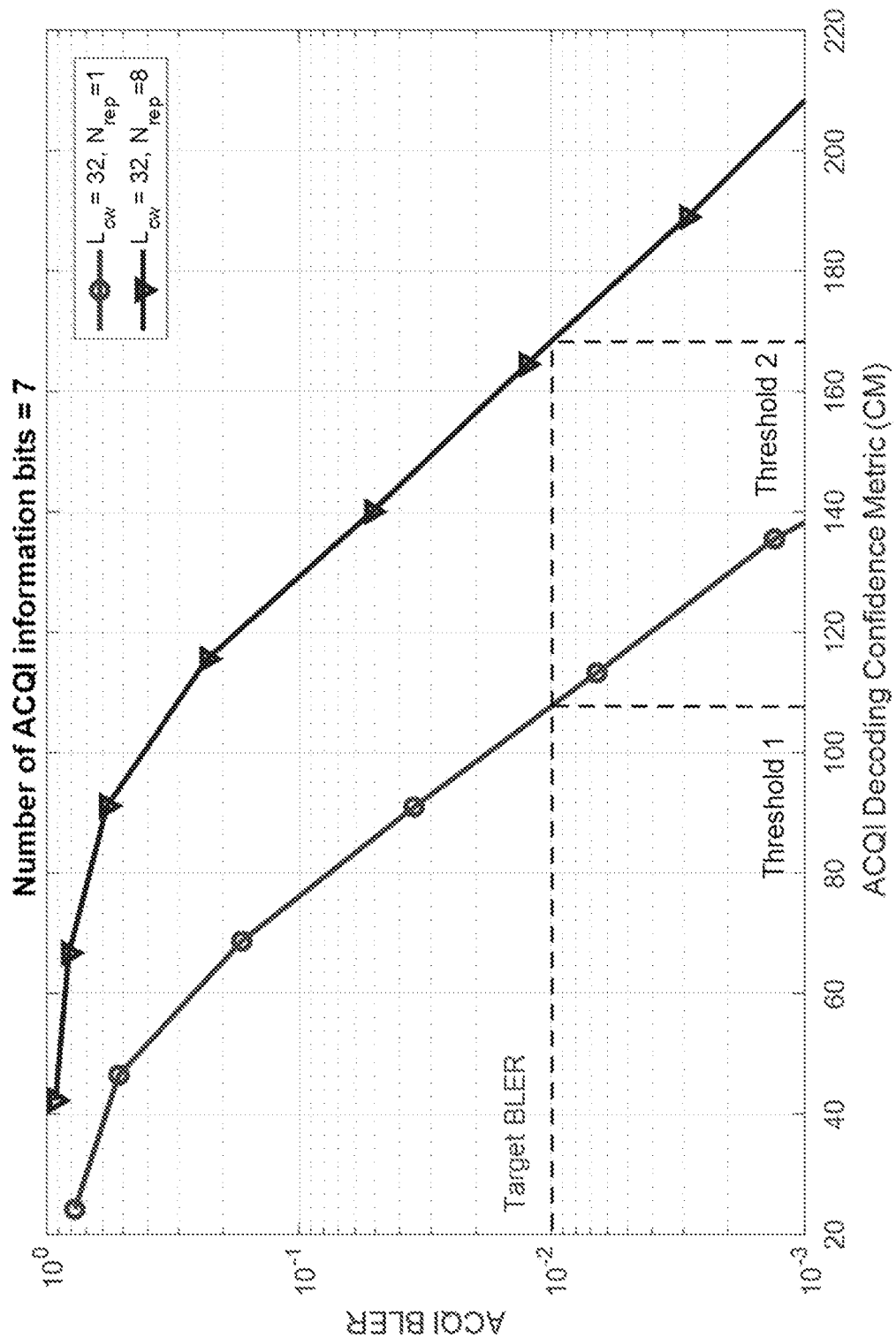
FIG. 3 shows another example embodiment of the subject matter described herein.

Referring also to FIG. 3, this figure represents an ACQI BLER vs. CM relationship built with the measurement data for configuration $\{L_{cw}=32, N_{rep}=1\}$ and $\{L_{cw}=32, N_{rep}=8\}$ assuming 7 ACQI information bits in accordance with exemplary embodiments. Given a target ACQI decoding performance requirement (for example BLER=1%), the CM threshold (threshold 1 and threshold 2) for the two configurations can be determined from the BLER vs, CM cures in FIG. 2. Another possible performance metric is based on the ACQI reporting performance, i.e., the trade-off between the ACQI reporting error rate $P_e$ and miss report rate $P_m$. Given the target $P_e$ and $P_m$ requirements, the CM threshold for each selected configuration can be determined from the measurement data as well.

The inputs to module 230 are the ACQI decoding CM measurements for the selected system configurations, the system configurations, and the target performance requirements for the ACQI decoding or reporting.

The outputs from module 230 are the ACQI decoding CM thresholds determined to meet the performance requirements for a set of selected configurations and the compressed feature set, which in this example is $\{L_{cw}, N_{rep}\}$, associated with each selected configuration. The outputs from module 230 will be used by module 240 to do the ACQI decoding CM threshold modeling so that the CM threshold for all possible system configurations can be predicted using this model.

ACQI Decoding CM Threshold Modeling Module

Module 240 utilizes machine learning techniques to perform ACQI CM threshold modeling with the measurement outputs from module 230 being used as training data. Supervised machine learning algorithms can be used for the CM threshold modeling, such as linear regression and neural networks techniques for example. The compressed features are the reduced parameters (e.g. one or more system configuration parameters) derived from the system configurations which are used for the CM threshold modeling. In other words, it is assumed that the ACQI CM threshold is only a function of the compressed features. Referring again to the example above, assume the two compressed features are ACQI TX codeword length $L_{cw}$ and CAT-M PUSCH transmission repetition count $N_{rep}$. To do the CM threshold modeling at block 242, N features denoted as $x_i$ (1=0, 1, . . . , N−1), are constructed where each feature $x_i$ is a function of the compressed features (e.g. $L_{cw}$ and $N_{rep}$ in this case). As an example, suppose linear regression is used for the threshold modeling with N features. In this case, the CM threshold y can be modeled as:

$$y_\theta(x) = f_\theta(x) = \sum_{i=0}^{N-1} \theta_i x_i = \theta^T x \tag{2}$$

where $\theta=[\theta_0, \theta_1, \ldots, \theta_{N-1}]^T$ is the modeling parameter vector that needs to be determined and $x=[x_0, x_1, \ldots, x_{N-1}]^T$ is the feature vector $(\cdot)^T$ that denotes the matrix transpose operator.

For example, for N=6, the features may be defined below as a function of the compressed features $L_{cw}$ and $N_{rep}$:

$$x_0=1, x_1=L_{cw}, x_2=N_{rep}, x_3=L_{cw}^2, x_4=N_{rep}^2, x_5=L_{cw} \cdot N_{rep} \tag{3}$$

The modeling parameter θ can be determined by minimizing the following cost function over the training sets:

$$J(\theta)=\Sigma_{k \in \Psi}(\theta^T x^{(k)} - y^{(k)})^2 \tag{4}$$

where Ψ is the ACQI CM threshold training set generated by module 230. $x^{(k)}$ and $y^{(k)}$ are the feature vector and CM threshold, respectively, for the k-th training sample.

Once the modeling parameters are determined, the ACQI CM threshold for all possible system configurations (characterized by the compressed features) can be predicted with the model to generate CM threshold table 244. For example, module 240 may generate a CM threshold table 244 for all ACQI configurations (indexed by the compressed features). The CM threshold table 244 may be copied (or transferred, communicated, moved, etc.) via operation 250 from the training device 141 to the RAN node 170 so that it can be utilized by module 220. For example, the physical layer of the RAN Node 170 may compare the ACQI decoding CM against the thresholds in this CM threshold table 245 before reporting ACQI to the scheduler 206.

According to some example embodiments, the CM threshold table 245 used at the RAN node 170 may be a variance of the CM threshold table 244 generated by module 240 based on system performance requirements. For example, post-processing may be performed on the CM thresholds table 244 generated by module 240 to simplify the implementation at the RAN node 170 such as via operation 250. As a non-limiting example, the operation 250 may include compressing the CM threshold table 244. In case of compression, the CM threshold table 244 may be different (e.g. smaller in size) than the CM threshold 245.

As a non-limiting example, assume the CM threshold table 244 is indexed by two parameters, e.g. $L_{cw}$ and $N_{rep}$, for all possible configurations. Operation 250 may compress the CM threshold table 244 by averaging the thresholds in CM threshold table 244 over the $L_{cw}$ dimension to generate a CM threshold table 245 with smaller size than CM threshold table 244. In this example, the thresholds in CM threshold table 245 are indexed by one parameter, i.e., $N_{rep}$.

According to some example embodiments, the training device 141 may perform the operations of component 209 in an offline-process (such as before the RAN node 170 is deployed in a network for example).

Although the description above generally refers to the UL direction (i.e. UE to eNodeB) on a DL transmission this is not intended to be limiting, and it should be understood that the techniques described herein may also be applied in the DL direction on UL transmissions. Furthermore, the techniques described herein be applied to any machine-machine wireless transmissions where fast feedback and reliable is desired, such as, but not limited to, for example: between walkie-talkies without fixed network equipment where the walkie-talkies dynamically change their modulation scheme to save battery power and maximize transmission throughput; WI-FI situations such as smart speakers, smart thermostats, for example; and, generally to any decoding metric for any decoding scheme (such as FHT as a non-limiting example).

FIG. 4 is a logic flow diagram for ACQI decoding confidence detection. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the calculation module 150-1 and/or 150-2 may include multiples ones of the blocks in FIG. 4, where each included block is an interconnected means for performing the function in the block. The blocks in FIG. 4 are assumed to be performed by a base station such as RAN node 170, e.g., under control of the calculation module 150-1 and/or 150-2 at least in part.

According to an example of an embodiment (which may be referred to as example 1), a method is provided including: decoding, at a base station of a wireless system, one or more bits of an uplink transmission from a user equipment, wherein the one or more bits are indicative of a channel quality as indicated by block 400; calculating a confidence metric corresponding to a reliability of the decoding as indicated by block 402; and causing a channel quality report to be generated based at least on the calculated confidence metric and a value for each system configuration parameter in a limited set of one or more system configuration parameters associated with the base station as indicated by block 404.

An example of a further embodiment (which may be referred to as example 2), is a method as in example 1, the method including using a lookup table to determine a confidence threshold value based on the values for the one or more system configuration parameters; in response to determining the calculated confidence metric exceeds the determined confidence threshold value, causing the one or more bits to be included in the channel quality report; and in response to determining the calculated confidence metric does not exceed the determined confidence threshold value, discarding the one or more bits from the channel quality report.

An example of a further embodiment (which may be referred to as example 3), is a method as in example 2, wherein the lookup table comprises a plurality of different threshold confidence values indexed by the one or more system configuration parameters.

An example of a further embodiment (which may be referred to as example 4), is a method as in any one of examples 1-3, wherein the one or more system configuration parameters comprise at least one of: a channel quality indicator codeword length used for the uplink transmission; and a number of repetitions for the uplink transmission.

An example of a further embodiment (which may be referred to as example 5), is a method as in any one of examples 1-4, wherein the decoding of the one or more bits of the uplink transmission comprises: performing extended Reed-Muller decoding based on log likelihood ratios extracted from the uplink transmission.

An example of a further embodiment (which may be referred to as example 6), is a method as in any one of examples 1-5, wherein the uplink transmission is a physical uplink shared channel transmission, and wherein the method further comprises: causing a modulation and coding scheme to be selected for a downlink transmission to the user equipment based on the channel quality report; and transmitting the downlink transmission.

An example of a further embodiment (which may be referred to as example 7), is a method as in any one of examples 1-6, wherein the uplink transmission is transmitted without either cyclic redundancy check or acknowledgement.

An example of a further embodiment (which may be referred to as example 8), is a method as in any one of examples 1-7, wherein the wireless network comprises a Long Term Evolution Category M network.

In an example embodiment, an apparatus is provided (which may be referred to as example 9) including: means for decoding, at a base station of a wireless system, one or more bits of an uplink transmission from a user equipment, wherein the one or more bits are indicative of a channel quality; means for calculating a confidence metric corresponding to a reliability of the decoding; and means for causing a channel quality report to be generated based at least on the calculated confidence metric and a value for each system configuration parameter in a limited set of one or more system configuration parameters associated with the base station.

An example of a further embodiment (which may be referred to as example 10), is an apparatus as in example 10), further comprising means for performing a method as in any one of examples 2-8.

An example of a further embodiment (which may be referred to as example 11), is a computer readable medium comprising program instructions for causing an apparatus to perform at least the following: decoding, at a base station of a wireless system, one or more bits of an uplink transmission from a user equipment, wherein the one or more bits are indicative of a channel quality; calculating a confidence metric corresponding to a reliability of the decoding; and causing a channel quality report to be generated based at least on the calculated confidence metric and a value for each system configuration parameter in a limited set of one or more system configuration parameters associated with the base station.

An example of a further embodiment (which may be referred to as example 12), is a computer readable medium as in example 11, wherein the program instructions further cause the apparatus to perform a method as in any one of examples 2-8.

In an example embodiment (which may be referred to as example 13), an apparatus is provided comprising: at least one processor; and at least one non-transitory memory including computer program code, the at least one memory and the computer program code configured to, with the at least one processor, cause the apparatus to perform at least decoding, at a base station of a wireless system, one or more bits of an uplink transmission from a user equipment, wherein the one or more bits are indicative of a channel quality; calculating a confidence metric corresponding to a reliability of the decoding; and causing a channel quality report to be generated based at least on the calculated confidence metric and a value for each system configuration parameter in a limited set of one or more system configuration parameters associated with the base station.

An example of a further embodiment (which may be referred to as example 14), is an apparatus as in example 13, wherein the apparatus is further caused to perform a method as in any one of examples 2-8.

FIG. 5 is a logic flow diagram for ACQI decoding confidence detection. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the training module 145-1 and/or 145-2 may include multiples ones of the blocks in FIG. 5, where each included block is an interconnected means for performing the function in the block. The blocks in FIG. 5 are assumed to be performed by the training device 141, e.g., under control of the training module 145-1 and/or 145-2 at least in part.

According to an example of an embodiment (which may be referred to as example 15), a method is provided including: for each respective system configuration in a first subset of system configurations of a wireless network: analyzing measurement data associated with the respective system configuration to determine a relationship between a confidence metric and a channel quality indicator decoding performance metric for the respective system configuration, and determining a corresponding confidence metric threshold value that meets a performance requirement for the respective system configuration based on the determined relationship as indicated by block 500; and generating, via a machine learning process, a confidence metric threshold model to predict further confidence metric threshold values for further system configurations of the wireless network, wherein the confidence metric threshold model is trained using at least the determined confidence metric threshold values for the first subset of system configurations and a limited set of one or more system configuration parameters corresponding to the system configurations as indicated by block 502.

An example of a further embodiment (which may be referred to as example 16), is a method as in example 15, the method including generating a look up table based on the trained confidence metric threshold model wherein the confidence metric threshold values and the further confidence metric threshold values are indexed by the limited set of the one or more system configuration parameters.

An example of a further embodiment (which may be referred to as example 17), is a method as in example 16, the method further including distributing the look up table to one or more base stations of the wireless network for controlling a channel quality indicator decoding process of the one or more base stations.

An example of a further embodiment (which may be referred to as example 18), is a method as in any one of examples 16-17, wherein the lookup table comprises a plurality of different threshold confidence values indexed by the limited set of the one or more system configuration parameters.

An example of a further embodiment (which may be referred to as example 19), is a method as in any one of examples 15-18, wherein the limited set of the one or more system configuration parameters corresponding to the system configurations are selected by a user via user input.

An example of a further embodiment (which may be referred to as example 20), is a method as in any one of examples 15-19, wherein the wireless network comprises Long Term Evolution Category M network.

In an example embodiment, an apparatus is provided (which may be referred to as example 21) including: for each respective system configuration in a first subset of system configurations of a wireless network: means for analyzing measurement data associated with the respective system configuration to determine a relationship between a confidence metric and a channel quality indicator decoding performance metric for the respective system configuration, and means for determining a corresponding confidence metric threshold value that meets a performance requirement for the respective system configuration based on the determined relationship; and means for generating, via a machine learning process, a confidence metric threshold model to predict further confidence metric threshold values for further system configurations of the wireless network, wherein the confidence metric threshold model is trained using at least the determined confidence metric threshold values for the first subset of system configurations and a limited set of the one or more system configuration parameters corresponding to the system configurations An example of a further embodiment (which may be referred to as example 22), is an apparatus as in example 21), further comprising means for performing a method as in any one of examples 16-20.

An example of a further embodiment (which may be referred to as example 23), is a computer readable medium comprising program instructions for causing an apparatus to perform at least the following: for each respective system configuration in a first subset of system configurations of a wireless network: analyzing measurement data associated with the respective system configuration to determine a relationship between a confidence metric and a channel quality indicator decoding performance metric for the respective system configuration, and determining a corresponding confidence metric threshold value that meets a performance requirement for the respective system configuration based on the determined relationship; and generating, via a machine learning process, a confidence metric threshold model to predict further confidence metric threshold values for further system configurations of the wireless network, wherein the confidence metric threshold model is trained using at least the determined confidence metric threshold values for the first subset of system configurations and a limited set of one or more system configuration parameters corresponding to the system configurations.

An example of a further embodiment (which may be referred to as example 24), is a computer readable medium as in example 23, wherein the program instructions further cause the apparatus to perform a method as in any one of examples 16-20.

In an example embodiment (which may be referred to as example 25), an apparatus is provided comprising: at least one processor; and at least one non-transitory memory including computer program code, the at least one memory and the computer program code configured to, with the at least one processor, cause the apparatus to perform at least: for each respective system configuration in a first subset of system configurations of a wireless network: analyzing measurement data associated with the respective system configuration to determine a relationship between a confidence metric and a channel quality indicator decoding performance metric for the respective system configuration, and determining a corresponding confidence metric threshold value that meets a performance requirement for the respective system configuration based on the determined relationship; and generating, via a machine learning process, a confidence metric threshold model to predict further confidence metric threshold values for further system configurations of the wireless network, wherein the confidence metric threshold model is trained using at least the determined confidence metric threshold values for the first subset of system configurations and a limited set of one or more system configuration parameters corresponding to the system configurations.

An example of a further embodiment (which may be referred to as example 26), is an apparatus as in example 25, wherein the apparatus is further caused to perform a method as in any one of examples 16-20.

Without in any way limiting the scope, interpretation, or application of the claims appearing below, a technical effect of one or more of the example embodiments disclosed herein is providing a ACQI decoding confidence metric that is a more accurate measurement about the decoding confidence than previous solutions as it embodies the effects of many other factors impacting the ACQI decoding performance, such as SNR, LLR erasure rate, ACQI transmission codeword length and number of repetitions used by CAT-M devices, etc. Another technical effect of one or more of the example embodiments disclosed herein is providing a lower overhead for calculating the proposed confidence metric low as compared to other metrics since almost all computation is performed during ACQI decoding.

Another technical effect of one or more of the example embodiments disclosed herein is that the threshold table for ACQI reporting decisions is greatly simplified (reduced in size) based on this metric and the machine learning based threshold modeling techniques so that each threshold entry is indexed by a limited amount of system configuration parameters, e.g., two parameters (compressed features). Another technical effect of one or more of the example embodiments disclosed herein is that the machine learning based threshold modeling technique enables robust and adaptive threshold modeling given a limited number of training samples and performance requirements.

A non-limiting use case of one or more example embodiments is for the LTE CAT-M ACQI (without CRC) decoding confidence detection. Those skilled in the art will appreciate that the techniques for detecting the decoding confidence described herein are also applicable to any communication system. In general, the techniques can be used for detection via "pattern matching", in which case the "correlation metric" is the distance between the two patterns (where it is assumed a distance metric can be defined quantitatively over the space). A set of reduced "compressed features" may then be extracted before performing the machine learning based decision threshold modeling to reduce the degree of freedom in the system design.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIGS. 1A-1B. A computer-readable medium may comprise a computer-readable storage medium (e.g., memories 125, 146 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   decoding, at a base station of a wireless system, one or more bits of an uplink transmission from a user equipment, wherein the one or more bits are indicative of a channel quality;
   calculating a confidence metric based on a correlation metric for codeword selection and corresponding to a reliability of the decoding,
   wherein the correlation metric for codeword selection comprises aperiodic channel quality indication decoding performance using at least one of a signal to noise ratio, a log-likelihood ratio, an erasure rate, an aperiodic channel quality indication transmission codeword length, or a number of repetitions used; and causing a channel quality report to be generated based at least on the calculated confidence metric and a value for each system configuration parameter in a limited set of one or more system configuration parameters associated with the base station, the one or more system configuration parameters comprising a number of repetitions for the uplink transmission.

2. The method as in claim 1, further comprising:
using a lookup table to determine a confidence threshold value based on the values for the one or more configuration parameters;
in response to determining the calculated confidence metric exceeds the determined confidence threshold value, causing the one or more bits to be included in the channel quality report; and
in response to determining the calculated confidence metric does not exceed the determined confidence threshold value, discarding the one or more bits from the channel quality report.

3. The method as in claim 2, wherein the lookup table comprises a plurality of different threshold confidence values indexed by the one or more system configuration parameters.

4. The method as in claim 1, wherein the one or more system configuration parameters comprise at least one of:
a channel quality indicator codeword length used for the uplink transmission; or
the number of repetitions for the uplink transmission.

5. The method as in claim 1, wherein the decoding of the one or more bits of the uplink transmission comprises:
performing extended Reed-Muller decoding based on log likelihood ratios extracted from the uplink transmission.

6. The method as in claim 1, wherein the uplink transmission is a physical uplink shared channel transmission, and wherein the method further comprises:
causing a modulation and coding scheme to be selected for a downlink transmission to the user equipment based on the channel quality report; and
transmitting the downlink transmission.

7. The method as in claim 1, wherein the uplink transmission is transmitted without either cyclic redundancy check or acknowledgement.

8. The method as in claim 1, wherein the wireless network comprises a Long Term Evolution Category M network.

9. An apparatus, comprising:
at least one processor; and
at least one non-transitory memory storing instructions, that when executed by the at least one processor, cause the apparatus at least to:
decode, at a base station of a wireless system, one or more bits of an uplink transmission from a user equipment, wherein the one or more bits are indicative of a channel quality;
calculate a confidence metric based on a correlation metric for codeword selection and corresponding to a reliability of the decoding,
wherein the correlation metric for codeword selection comprises aperiodic channel quality indication decoding performance using at least one of a signal to noise ratio, a log-likelihood ratio, an erasure rate, an aperiodic channel quality indication transmission codeword length, or a number of repetitions used; and
cause a channel quality report to be generated based at least on the calculated confidence metric and a value for each system configuration parameter in a limited set of one or more system configuration parameters associated with the base station, the one or more system configuration parameters comprising a number of repetitions for the uplink transmission.

10. The apparatus as in claim 9, wherein at least one non-transitory memory is storing instructions executed by the at least one processor to cause the apparatus at least to:
use a lookup table to determine a confidence threshold value based on the values for the one or more system configuration parameters;
in response to determining the calculated confidence metric exceeds the determined confidence threshold value, cause the one or more bits to be included in the channel quality report; and
in response to determining the calculated confidence metric does not exceed the determined confidence threshold value, discard the one or more bits from the channel quality report.

11. The apparatus as in claim 10, wherein the lookup table comprises a plurality of different threshold confidence values indexed by the one or more system configuration parameters.

12. The apparatus as in claim 9, wherein the one or more system configuration parameters comprise:
a channel quality indicator codeword length used for the uplink transmission; and the number of repetitions for the uplink transmission.

13. The apparatus as in claim 9, wherein the at least one non-transitory memory is storing instructions executed by the at least one processor to cause the apparatus at least to:
decode the one or more bits of the uplink transmission comprising:
performing extended Reed-Muller decoding based on log likelihood ratios extracted from the uplink transmission.

14. The apparatus as in claim 9, wherein the uplink transmission is a physical uplink shared channel transmission, and wherein at least one non-transitory memory is storing instructions executed by the at least one processor to cause the apparatus at least to:
cause a modulation and coding scheme to be selected for a downlink transmission to the user equipment based on the channel quality report; and
transmit the downlink transmission.

15. The apparatus as in claim 9, wherein the uplink transmission is transmitted without either cyclic redundancy check or acknowledgement.

16. The apparatus as in claim 9, wherein the wireless network comprises a Long Term Evolution Category M network.

17. A non-transitory computer readable medium comprising program instructions for causing an apparatus to perform at least the following:
decoding, at a base station of a wireless system, one or more bits of an uplink transmission from a user equipment, wherein the one or more bits are indicative of a channel quality;
calculating a confidence metric based on a correlation metric for codeword selection and corresponding to a reliability of the decoding,
wherein the correlation metric for codeword selection comprises aperiodic channel quality indication decoding performance using at least one of a signal to noise ratio, a log-likelihood ratio, an erasure rate, an aperiodic channel quality indication transmission codeword length, or a number of repetitions used; and causing a channel quality report to be generated based at least on the calculated confidence metric and a value for each system configuration parameter in a limited set of one or more system configuration parameters associated with the base station, the one or more system configuration parameters comprising a number of repetitions for the uplink transmission.

18. The non-transitory computer readable medium as in claim 17, wherein the program instructions cause the apparatus to further perform:

using a lookup table to determine a confidence threshold value based on the values for the one or more system configuration parameters;

in response to determining the calculated confidence metric exceeds the determined confidence threshold value, causing the one or more bits to be included in the channel quality report; and in response to determining the calculated confidence metric does not exceed the determined confidence threshold value, discarding the one or more bits from the channel quality report.

19. The non-transitory computer readable medium as in claim 18, wherein the lookup table comprises a plurality of different threshold confidence values indexed by the one or more system configuration parameters.

20. The non-transitory computer readable medium as claim 17, wherein the one or more system configuration parameters comprise at least one of:

a channel quality indicator codeword length used for the uplink transmission; or the number of repetitions for the uplink transmission.

* * * * *